United States Patent [19]

Chang

[11] Patent Number: 5,384,604
[45] Date of Patent: Jan. 24, 1995

[54] COLLAPSIBLE GLASSES

[76] Inventor: Tien-Tzu Chang, No. 1, Alley 99, Lane 274, S. Chung-Chen Road, Yung-Kang, Tainan Shien, Taiwan, Prov. of China

[21] Appl. No.: 281,598
[22] Filed: Jul. 28, 1994
[51] Int. Cl.⁶ .............................................. G02C 5/08
[52] U.S. Cl. ...................................... 351/63; 351/119; 351/126; 351/153
[58] Field of Search ................... 351/41, 63, 111, 114, 351/119, 120, 121, 124, 126, 153; 16/228

[56] References Cited

U.S. PATENT DOCUMENTS

| | | | |
|---|---|---|---|
| 531,095 | 12/1894 | Brunner | 351/63 |
| 1,936,319 | 7/1931 | Wingate | 351/124 |
| 2,537,248 | 3/1947 | Vigano | 351/63 |
| 5,028,126 | 7/1991 | Takeuchi | 351/63 |
| 5,218,384 | 6/1993 | Nakamats | 351/63 |
| 5,231,429 | 7/1993 | Kanda | 351/119 |

FOREIGN PATENT DOCUMENTS 354168  2/1930  United Kingdom .................. 351/63

Primary Examiner—William L. Sikes
Assistant Examiner—Huy Mai

[57] ABSTRACT

A pair of collapsible glasses comprising two lens frames, a bridge pivotally connected between the two lens frames, two butterfly-shaped connecters respectively pivotally connecting a round front half temple with one of the two lens frame, two front half temples respectively pivotally connected with a rear half temple of a C shape made of elastic material, the two connecters able to be pivotally bent to let the front and the rear half temples stretched outward to fit the size of the face of a wearer, the two lens frames being foldable to the front of the bridge, the two front half temples being foldable to the side of the lens frames, and the rear half temples being foldable to the side of of the front half temples.

3 Claims, 5 Drawing Sheets

COLLAPSIBLE GLASSES

BACKGROUND OF THE INVENTION

This invention relates to a pair of collapsible glasses, and more particularly to collapsible lens frames, connecters, two temples consisting of a front half temple and a rear half temple, all pivotally connected with each other for collapsing to various interesting forms.

Nowadays, conventional glasses generally have their temples of definite length and angle, impossible to suit to various size of the face of a wear, and collapsible glasses are made to collapsible to a small size only, not changeable in its collapsed form.

SUMMARY OF THE INVENTION

This invention has an object to offer a pair of collapsible glasses wearable for adults and even children, and collapsible to various forms to satisfy curiosity of people.

The main feature of the present invention lies in a cow-head-shaped bridge connecting two lens frames, and two butterfly-shaped connecters respectively pivotally connecting the lens frame with a round front half temple, which is then pivotally connected with a rear half temple made of an elastic material and shaped as C with an opening facing downward. Then the width of the two temples can be stretched by bending the connectors to suit any size of the face of a user, and the lens frames, the connecters, the front half temples and the rear half temples are all foldable to be collapsed to a small size of various forms such as a cow head.

DETAILED DESCRIPTION OF THE INVENTION

Figure 1:
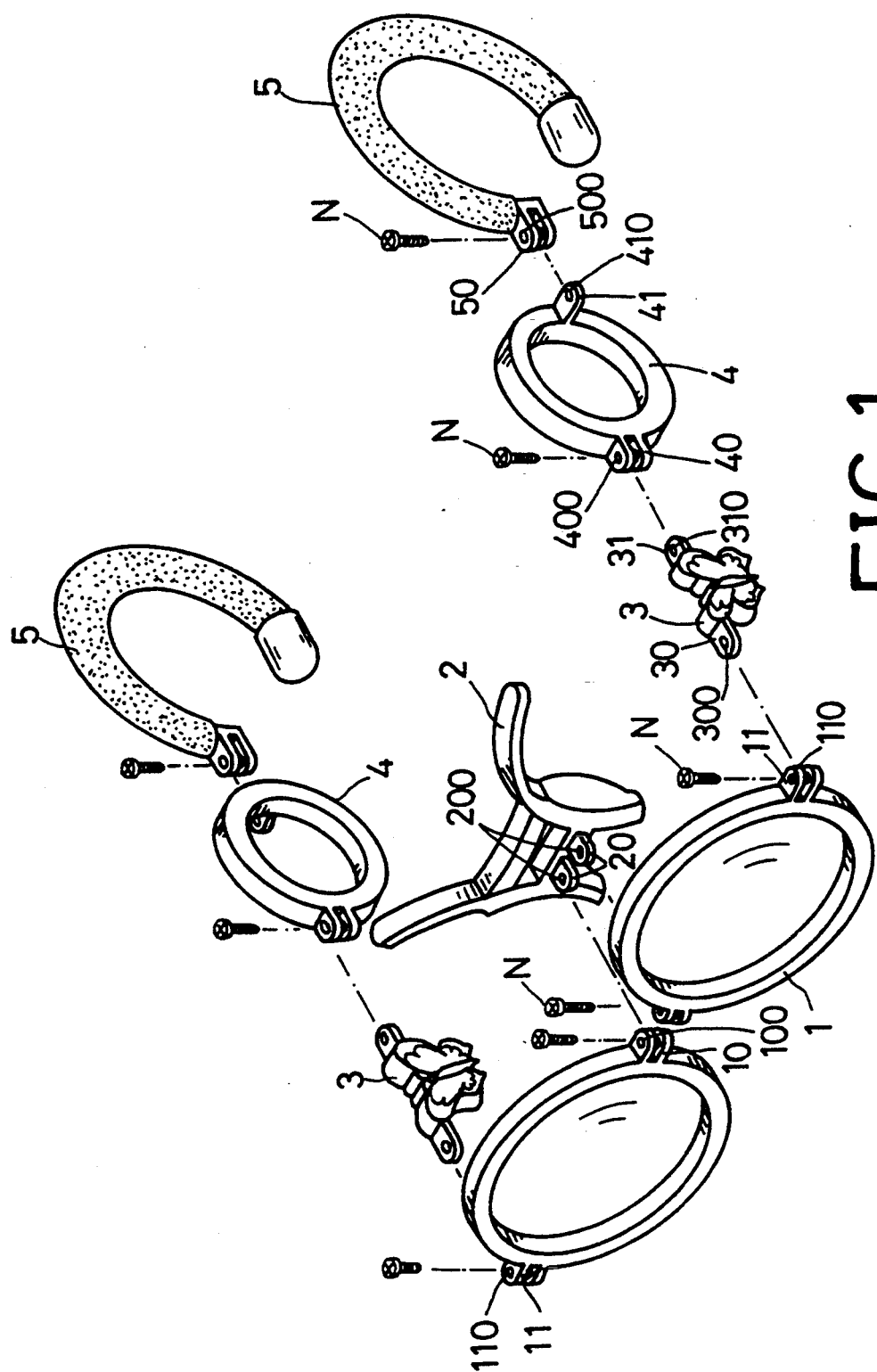
FIG. 1 is an exploded perspective view of collapsible collapsible glasses in the present invention.

A pair of collapsible glasses in the present invention, as shown in FIG. 1, comprises two round lens frames 1, 1, a nose bridge 2 shaped like a cow head, two butterfly-shaped connecters 3, 3, two round front half temples 4, 4 and two C-shaped rear half temples 5, 5 combined together.

Each of the two round lens frames 1, 1 having two pairs of projecting ears 10, 11 bored with screw holes 100, 110 respectively at two opposite sides.

The nose bridge 2 of a cowhead-shaped is connected between the two round lens frames 1, 1, having two projecting-forward aligned ears 20, 20 each bored with a screw hole 200 for screws N to combine pivotally the nose bridge 2 with the two lens frames 1, 1.

Each of the two butterfly-shaped connecters 3, 3 is to be connected between one of the lens frames 1 and one of the round front half temples 4, having two projecting ears 30, 31 each at a front and a rear end and a screw hole 300, 310 in each ear 30. 31.

Each of the front round half temple 4 is located between the related connecter 3 and the related C-shaped rear half temple 5, having a pair of projecting ears 40 each bored with a screw hole 400 for a screw N to combine pivotally the front half temple 4 with the related connecter 3, and a sidewise ear 41 bored with a screw hole 410 at a rear side for a screw N to combine pivotally the front half temple 4 with the related rear half temple 5.

Each of the C-shaped rear half temple 5 is made of an elastic material, having a pair of projecting ears 50 bored with a screw hole 500 for a screw N to combine pivotally the rear half temple 5 with the related front half temple 4.

Figure 2:
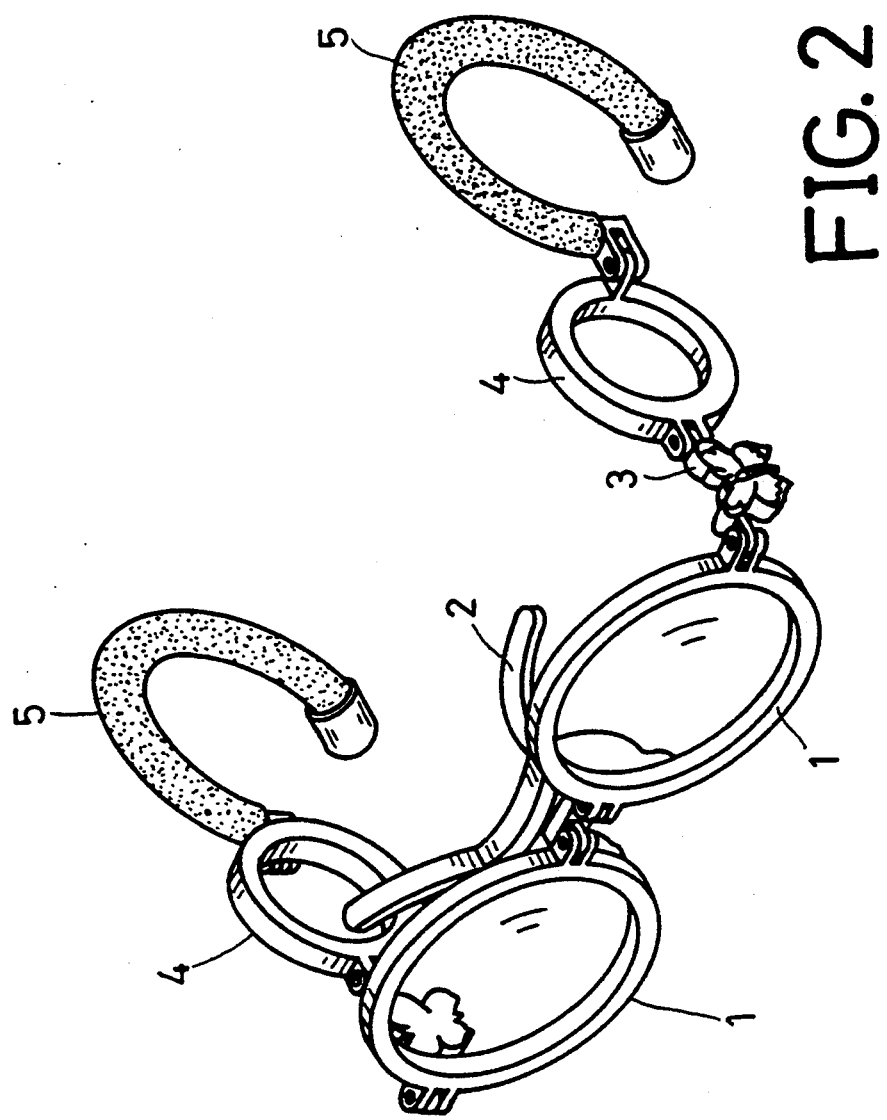
FIG. 2 is a perspective view of the collapsible glasses in the present invention.

In assembling, referring to FIGS. 1 and 2, the inner ears 10 of the two lens frames 1, 1 and the two ears 20, 20 of the nose bridge 2 connected together with screws N engaging the screw holes 100, 200. Next, the front ears 30, 30 of the two connecters 3, 3 and the outer ears 110, 110 of the two lens frames 1, 1 are connected together with screws N engaging through the screw holes 110, 300. Then, the rear ears 31, 31 of the two connecters 3, 3 and the front ears 40, 40 of the front half temples 4, 4 are connected together with screws N engaging the screw holes 310, 400. Finally, the rear ears 41, 41 of the two front half temples 4, 4 and the ears 500, 500 of the two rear half temples 5, 5 are connected together with screws N engaging the screw holes 410, 500.

Figure 3:
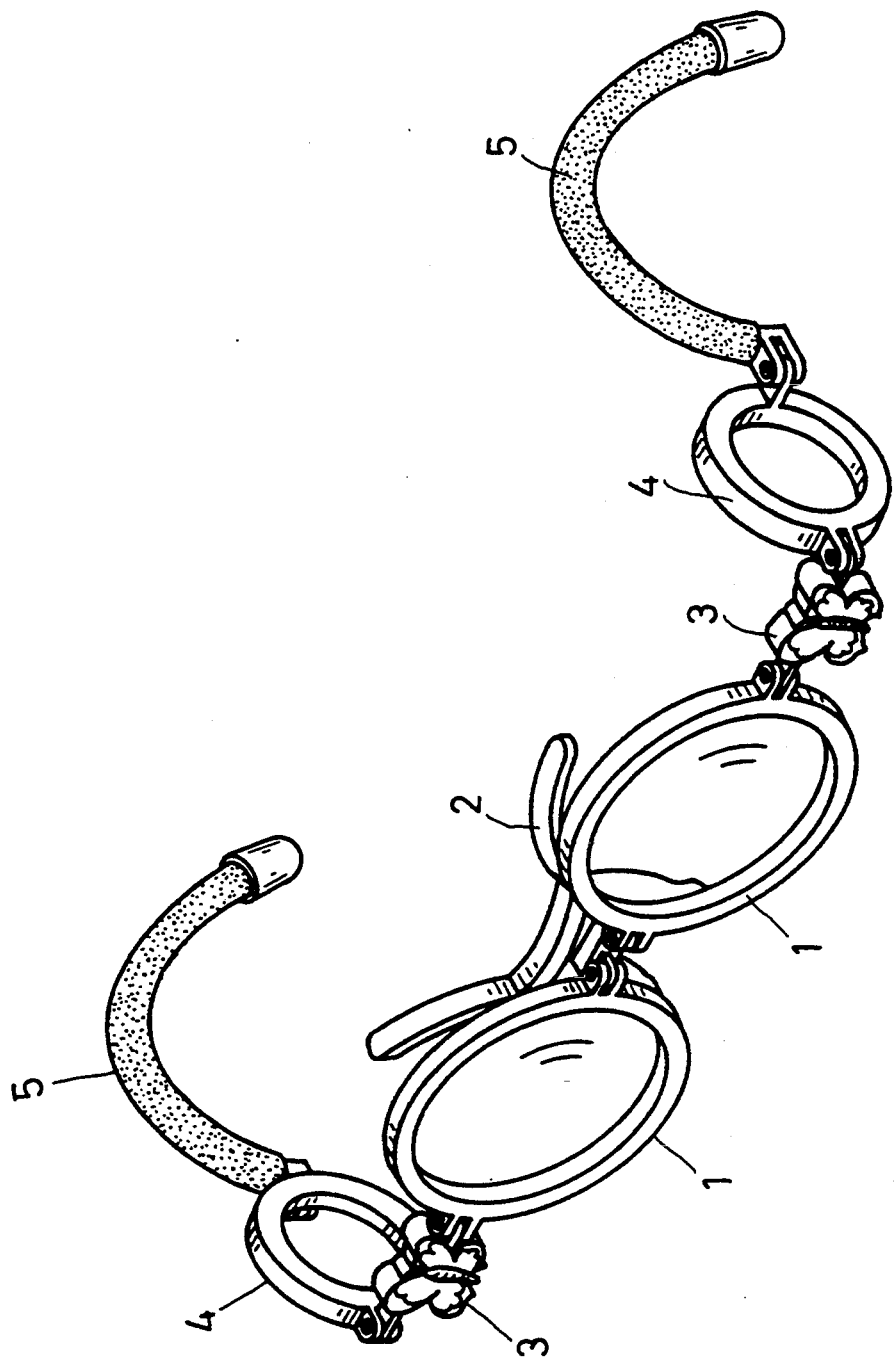
FIG. 3 is a perspective view of the collapsible glasses in the present invention, showing them in use.

In using, as shown in FIG. 3, the two connectors 3, 3 can be stretched outward to adjust the width of the temples to suit to a different size of a wearer by altering the angles of the two connecters against the front half temples 4, 4. And the rear half temples 5, 5 can be pulled to put on the ears of the wearer.

Figure 4:
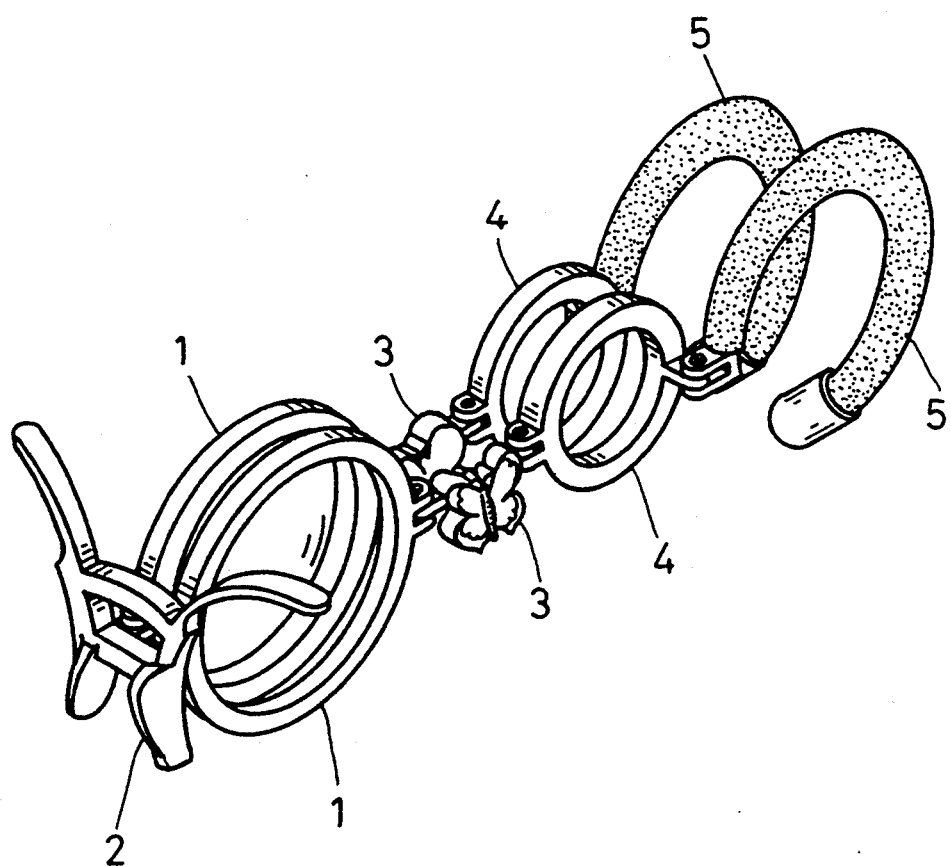
FIG. 4 is a perspective view of the collapsible glasses in the present invention, showing them folded in a straight line.
Figure 5:
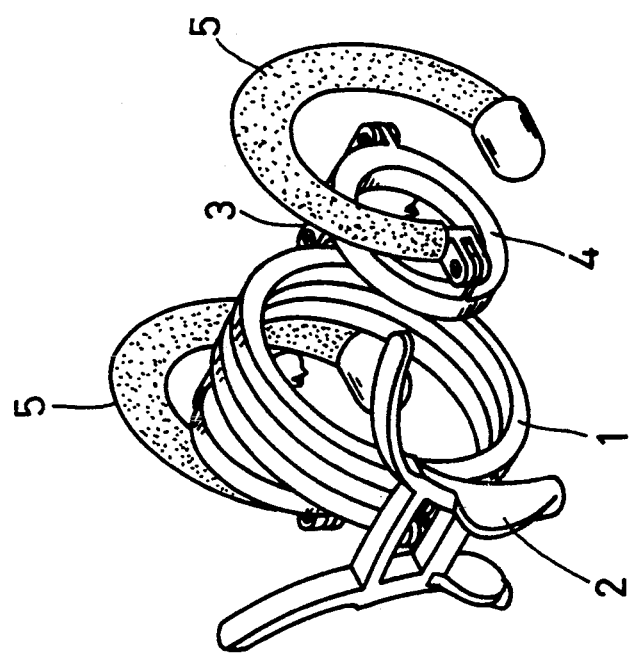
FIG. 5 is a perspective view of the collapsible glasses in the present invention, showing them collapsed completely.

In collapsing this glasses, as shown in FIG. 4, the two rear half temples 5, 5, the two front half temples 4, 4, the two connectors 3, 3 and the two lens frames 1, 1 are all folded to the front of the bridge 2, and then the front half temples 4, 4 and the rear half temples 5, 5 are respectively folded to the outer sides of the two lens frames 1, 1 as shown in FIG. 5. Consequently, the glasses is collapsed to a very small size, nearly looking like a cow head, a very queer shape, but also can be collapsed into various forms other than the cow head.

This invention has advantages as follows.

1. It can be folded to form various interesting shapes.
2. It can suit various sizes of faces of adults and children.

What is claimed is:

1. A pair of collapsible interesting glasses comprising two lens frames, a cowhead-shaped bridge pivotally connected between the two lens frames by means of screws, two butterfly-shaped connecters respectively pivotally connecting a lens frame with a round front half temple by means of screws, and two rear half temples respectively pivotally connected with two front half temples by means of screws, said pivotal connections enabling this pair of glasses be worn by various size of faces of wearers and be collapsed into various interesting forms.

2. The pair of collapsible interesting glasses as claimed in claim 1, wherein said lens frames, said bridge, said pivotal butterfly-shaped connecters, said front half temples and said rear half temples are provided with projecting ears each bored with a screw hole for screws to engage to pivotally combine with each other.

3. The pair of collapsible interesting glasses as claimed in claim 1, wherein said rear half temples is made of an elastic material and shaped as C with an opening facing downward.

* * * * *